(12) United States Patent
Chan et al.

(10) Patent No.: US 11,885,642 B2
(45) Date of Patent: Jan. 30, 2024

(54) LASER LEVELING TOOL WITH GESTURE CONTROL

(71) Applicant: Robert Bosch GmbH, Stuttgart (DE)

(72) Inventors: Chi Fung Chan, North Point (HK);
Yuk Wah Siu, North Point (HK); Wah Pong Calvin Chan, North Point (HK);
Kenneth Yuen, North Point (HK);
Chun Pong David Chan, North Point (HK)

(73) Assignee: Robert Bosch GmbH, Stuttgart (DE)

( * ) Notice: Subject to any disclaimer, the term of this patent is extended or adjusted under 35 U.S.C. 154(b) by 513 days.

(21) Appl. No.: 17/273,053

(22) PCT Filed: Sep. 12, 2018

(86) PCT No.: PCT/CN2018/105144
§ 371 (c)(1),
(2) Date: Mar. 3, 2021

(87) PCT Pub. No.: WO2020/051783
PCT Pub. Date: Mar. 19, 2020

(65) Prior Publication Data
US 2021/0341287 A1 Nov. 4, 2021

(51) Int. Cl.
*G01C 9/06* (2006.01)
*G06F 3/01* (2006.01)
(Continued)

(52) U.S. Cl.
CPC .............. *G01C 9/06* (2013.01); *G06F 3/017* (2013.01); *G01C 2009/066* (2013.01);
(Continued)

(58) Field of Classification Search
CPC .............. G01C 9/02; G01C 9/06; G06F 3/017
(Continued)

(56) References Cited

U.S. PATENT DOCUMENTS 5,689,330 A 11/1997 Gerard et al.
5,864,956 A * 2/1999 Dong .................... G01C 15/105
33/286
(Continued)

FOREIGN PATENT DOCUMENTS

CN 101533572 A 9/2009
CN 204831296 U 12/2015
(Continued)

OTHER PUBLICATIONS

International Search Report corresponding to PCT Application No. PCT/CN2018/105144, dated May 29, 2019 (English language document) (4 pages).

*Primary Examiner* — George B Bennett
(74) *Attorney, Agent, or Firm* — Maginot, Moore & Beck LLP

(57) ABSTRACT

A laser leveling tool comprising: gesture control means comprises at least one sensor adapted to sense gestures and/or movements of a user; and a controller in communication with the gesture control means for receiving signals from the sensor and generating control commands for the tool based on the received signals, the control commands comprising at least ON/OFF states of laser beam patterns that the tool can project.

18 Claims, 5 Drawing Sheets

(51) Int. Cl.
  *G06F 3/042* (2006.01)
  *G06F 3/044* (2006.01)
(52) U.S. Cl.
  CPC ............ *G06F 3/044* (2013.01); *G06F 3/0421* (2013.01); *G06F 2203/04108* (2013.01)
(58) Field of Classification Search
  USPC .......................................................... 33/290
  See application file for complete search history.

(56) References Cited

U.S. PATENT DOCUMENTS

| | | | | |
|---|---|---|---|---|
| 7,134,211 B2* | 11/2006 | Bascom | ................ | G01C 15/002 33/291 |
| 7,454,839 B2* | 11/2008 | Della Bona | ............ | F16M 11/14 33/291 |
| 7,797,844 B2* | 9/2010 | Hobden | ................ | G01C 15/004 33/286 |
| 9,303,990 B2* | 4/2016 | Bascom | ................ | G01C 15/002 |
| 9,441,963 B2* | 9/2016 | Yuen | ................... | G01C 15/004 |
| 9,441,967 B2* | 9/2016 | Ranieri | ................... | G01C 15/06 |
| 10,088,306 B1* | 10/2018 | Smith | ..................... | G01C 9/06 |
| 11,512,954 B2* | 11/2022 | Loebig | ................ | G01C 15/008 |
| 11,668,564 B2* | 6/2023 | Chan | ................... | G01C 15/004 33/290 |
| 2005/0172502 A1* | 8/2005 | Sergyeyenko | ....... | G01C 15/004 33/286 |
| 2010/0066673 A1 | 3/2010 | Yeh | | |

FOREIGN PATENT DOCUMENTS

| | | |
|---|---|---|
| CN | 105518576 A | 4/2016 |
| CN | 106933413 A | 7/2017 |
| CN | 108123353 A | 6/2018 |
| EP | 0 787 972 A2 | 8/1997 |
| WO | 2013/120271 A1 | 8/2013 |

* cited by examiner

LASER LEVELING TOOL WITH GESTURE CONTROL

This application is a 35 U.S.C. § 371 National Stage Application of PCT/CN2018/105144, filed on Sep. 12, 2018 in China, the disclosure of which is incorporated herein by reference in its entirety.

The disclosure relates to a laser leveling tool having gesture control functionalities for controlling the operation of the laser leveling tool.

BACKGROUND

Laser leveling tools or levelers are generally used in construction and decoration industries. A conventional laser leveling tool comprises at least one laser beam emitter for emitting a laser beam which is projected onto a target surface to form a predefined pattern serving as a reference for facilitating operation during construction or remodeling.

Laser leveling tools generally have HMIs via which users can control the operations of the laser leveling tools. HMIs of current laser leveling tools comprise physical press buttons to input commands of the users, like inputting initial settings, selecting and toggling different projection modes, or the like. A laser leveling tool is generally levelled in a proper position and orientation before operation, so the press actions may affect the levelled position and orientation of the leveling tool and thus there may be error or deflection in the projected pattern of the leveling tool.

In addition, when the leveling tool are designed to be able to project more types of patterns (for example, dot, line, plane, cross, etc.), more buttons need to be provided in the HMI, so the HMI will occupy a large area of the leveling tool.

In order to reduce the number of buttons, a single button design has been proposed, which allow the users to toggle ON/OFF of different types of laser patterns in cycle. This may confuse the users when they want to control one or a few specific laser patterns only.

SUMMARY

An object of the disclosure is to alleviate the deficiencies found in the laser leveling tools which are resulted from physical press buttons.

For achieving this object, in one aspect, the disclosure provides a laser leveling tool comprising: gesture control means comprises at least one sensor adapted to sense gestures and/or movements of a user; and a controller in communication with the gesture control means for receiving signals from the sensor and generating control commands for the tool based on the received signals, the control commands comprising at least ON/OFF states of laser beam patterns that the tool can project.

According to a possible embodiment, there are at least two sensors arranged at substantially the same height, and the controller is configured to generate a control command to activate a horizontal laser beam when the user is swiping from a first one of the at least two sensors to a second one of the at least two sensors and to generate a control command to deactivate the horizontal laser beam when the user is swiping from the second one of the at least two sensors to the first one of the at least two sensors.

According to a possible embodiment, there are least two sensors arranged at different heights, and the controller is configured to generate a control command to activate a vertical laser beam when the user is swiping from one of the at least two sensors to another one of the at least two sensors and to generate a control command to deactivate the vertical laser beam when the user is swiping from the another one of the at least two sensors to the one of the at least two sensors.

According to a possible embodiment, there is at least one sensor used to be taped on by the user, and the controller is configured to generate a control command to activate/deactivate a plumb laser dot when the user is taping on this sensor.

According to a possible embodiment, there are at least two sensors to be swiped by the user, and the controller is configured to generate a control command to activate/deactivate a plumb laser dot when the user is swiping from one of the at least two sensors to another one of the at least two sensors or from the another one of the at least two sensors to the one of the at least two sensors.

According to a possible embodiment, the tool comprises an HMI, and at least some of the sensors are arranged on or under a screen of the HMI.

According to a possible embodiment, the screen is provided with marks corresponding to the sensors for directing the user's swiping and/or taping actions.

According to a possible embodiment, the tool comprises a housing, and at least some of the sensors are arranged on the housing or at the inner side of the housing.

According to a possible embodiment, when the user is sensed by two sensors in sequence, there is a time delay between the signals of them, and the controller is configured to determine different laser on/off commands based on the signals of the sensors and the time delays.

According to a possible embodiment, the sensors have a sensor range of 10 to 20 mm.

According to a possible embodiment, the sensor is selected from infrared sensor, capacitive sensor, passive infrared sensor, resistive sensor and/or magnetic sensor.

According to a possible embodiment, the sensor comprises a sensor that can capture gestures and/or movements of the user when the user is within a capturing area of the sensor.

According to a possible embodiment, the sensor is configured to capture images of the user when the user is exposed in an irradiation in the capturing area of the sensor.

According to a possible embodiment, the irradiation comprises visible or invisible light.

According to a possible embodiment, the laser leveling tool further comprises an emitter configured to emit the visible or invisible light.

According to a possible embodiment, the sensors have a sensor range of several meters to dozens of meters.

According to a possible embodiment, the sensor is selected from camera, infrared sensor and/or passive infrared sensor.

According to a possible embodiment, the sensor has an adjustable sensor range.

In accordance with the disclosure, the leveling tool comprises gesture control functionalities to substitute the physical press buttons used in traditional leveling tools. In operation of the leveling tool, commands can be inputted by the swiping or taping actions of the user's body, and no press down action is needed. Deficiencies in the laser leveling tools resulted from physical press buttons are eliminated.

Other advantages and aspects of the disclosure will be described in the detailed description.

BRIEF DESCRIPTION OF THE DRAWINGS

The disclosure will be further understood by reading the following detailed description with reference to the drawings in which.

DETAILED DESCRIPTION

In general, the disclosure relates to a laser leveling tool. The laser leveling tool may be of any types and has any forms. Thus, the disclosure will be described with reference to some particular forms, but the scope of the disclosure all covers other forms of laser leveling tools.

Figure 1:
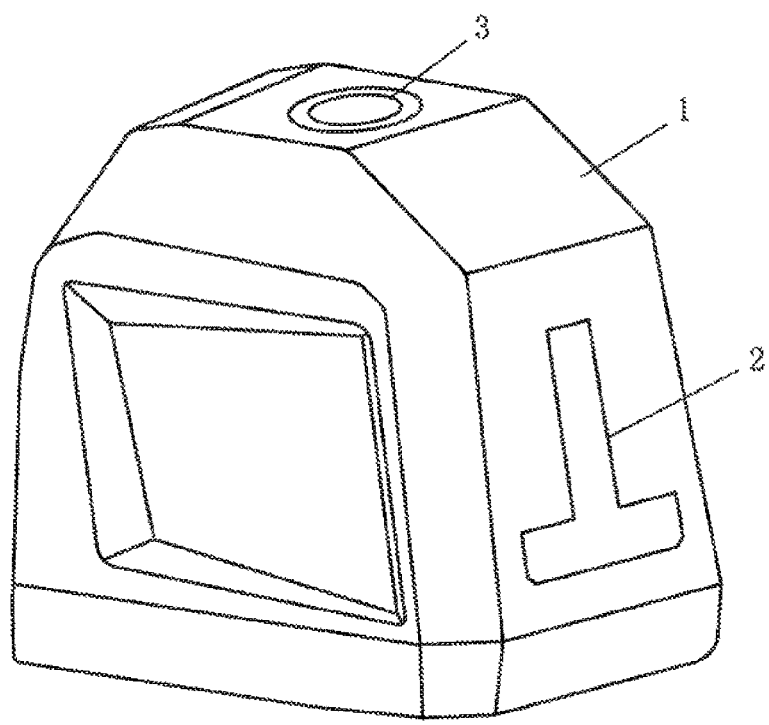
FIG. 1 is a schematic perspective view of a laser leveling tool according to an embodiment of the disclosure.
Figure 2:
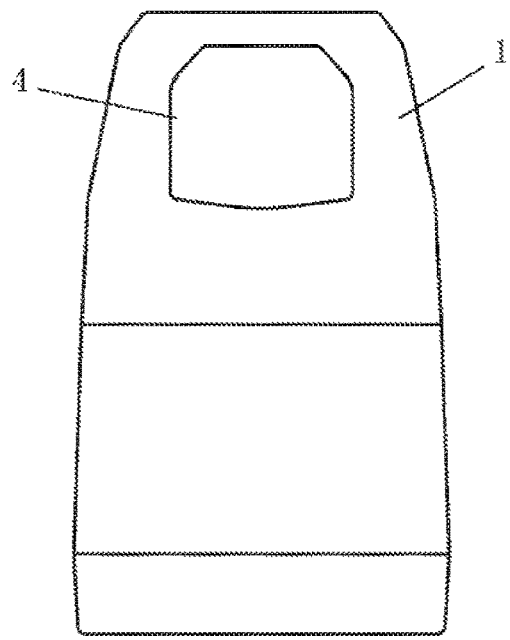
FIG. 2 is a schematic back view of the laser leveling tool of FIG. 1.

FIGS. 1 and 2 show a laser leveling tool in which the technique of the disclosure can be applied, wherein FIG. 1 shows the top, front and right sides of the tool and FIG. 2 shows the back side of the tool. As can be seen, the tool comprises a housing 1 in which functional components of the tool are mounted. A front projection window 2 is exposed on the front side of the housing 1, the front projection window 2 comprising a horizontal branch and a vertical branch extending above from the horizontal branch. Through the horizontal and vertical branches a horizontal laser beam and a vertical laser beam can be projected out respectively. A top projection window 3 through which a plumb laser dot can be projected out is exposed on the top side of the housing 1.

On an oblique back side portion of the housing 1, there is provided with an HMI 4 by means of which a user can input commands to the tool and which can display information about the state and operation of the tool.

The basic idea of the disclosure is to remove the press-down physical buttons used in the HMIs of traditional tools, and for this purpose the tool is equipped with gesture control means for sensing the user's gesture.

As an example, the HMI 4 is configured as the gesture control means that can sense gestures and/or motions of the user's body, especially hand or finger, and transform the sensed gestures into input commands for controlling the operation of the tool.

For sensing the gestures of the user, it is belied that short distance approach and long distance approach can be used here to achieve user's gesture sensing.

As short distance approach, some proximity sensors are studied and evaluated. In general, the user's finger is near the gesture control means, for example, in a short distance within 20 mm, so the working range of the sensors shall cover this distance range. Further, sensing precision, stability (under various environmental conditions, such as light, temperature and the like), sensitivity, etc. are also key factors in selecting sensors. It is found that IR (infrared) sensors and capacitive sensors meet almost all these requirements.

An IR sensor used here is equipped with an IR emitter for emitting IR rays and an IR receiver for sensing IR rays reflected from the user's hand or finger. When the user's finger is approaching the IR light emitted from the IR emitter, the IR light will be reflected by the finger, and the reflected IR light is sensed by the IR receiver. The working range of the IR sensor is adjustable, and is suitable for short distance use (for example, 10 to 20 mm).

A capacitive sensor used here can detect the change in capacitance when a user's finger touches or approaches the capacitive sensor. The sensor can pass through glass or plastic, so the capacitive sensor can be mounted inside the housing. The working range of the capacitive sensor is also adjustable, and is suitable for short distance use (for example, 10 to 20 mm).

It is understood that other types of proximity sensors, like passive IR sensors, resistive sensors, laser beam sensors, magnetic sensors, etc. may also meet the short distance approach requirements, possibly with some necessary adaption; for example, when passive IR sensors are used, some particularly designed lenses may needed for hand gesture sensing in a short distance.

Figure 3:
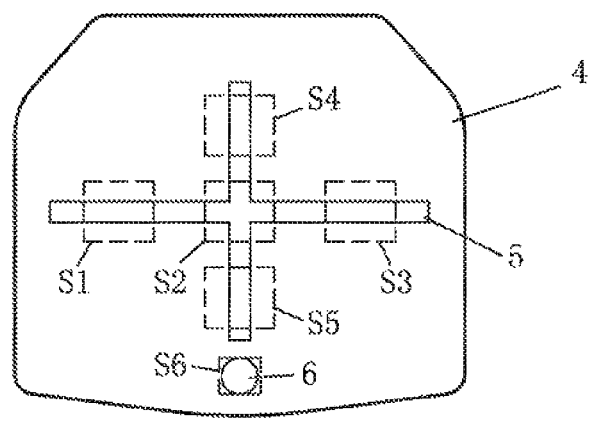
FIG. 3 is a schematic view of an HMI of the laser leveling tool according to a short distance approach embodiment of the disclosure, showing gesture control sensors and indication marks of the HMI.

Then, the HMI 4 is modified as gesture control means that incorporates proximity sensors having a working range of 10 to 20 mm. The proximity sensors are arranged in a pattern, suitable for sensing the gesture of a user's finger, within the range of the HMI 4. A particular pattern is shown in FIG. 3, in which sensors S1, S2 and S3 are arranged in a transverse line, and sensors S4, S2 and S5 are arranged in a longitudinal line, the transverse line and the longitudinal line intersecting at the sensor S2. A sensor S6 is arranged in the longitudinal line below the lowest sensor S5, although it can be alternatively arranged at other locations of the HMI 4.

When the sensor fields of the sensors S1 to S6 (for example, capacitive sensors) can pass through the screen of the HMI 4, the sensors can be mounted under the screen. On the other hand, when the sensor fields of the sensors S1 to S6 cannot pass through the screen of the HMI 4, the sensors can be mounted to the screen.

The transverse sensors S1, S2 and S3 can be used for sensing a substantially transverse (horizontal) movement of the user's finger, the longitudinal sensors S4, S2 and S5 can be used for sensing a substantially longitudinal (vertical) movement of the user's finger, and the sensor S6 can be used for sensing the tap of the user's finger. For directing the actions of the user's finger, a cross mark 5 is formed on the screen corresponding to the transverse sensors S1, S2 and S3 and the longitudinal sensors S4, S2 and S5, and a spot or circular tap mark 6 is formed on the screen corresponding to the sensor S6.

Figure 4:
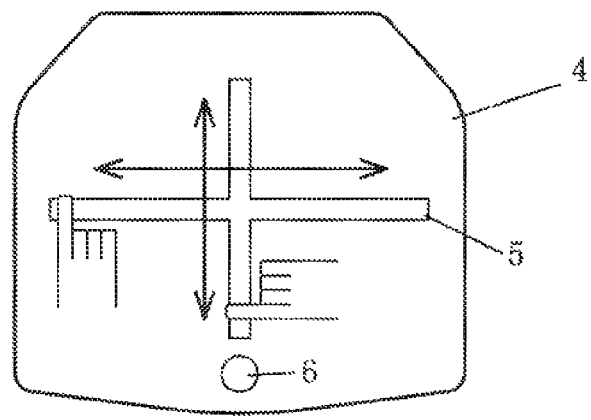
FIGS. 4 and 5 are schematic views showing actions that can be performed on the HMI for inputting commands to the leveling tool.

As shown in FIG. 4, when the user's finger approaches and moves along the branches of the cross mark 5 in horizontal and/or vertical directions as indicated by arrowed lines, the transverse or longitudinal sensors sense the action of the user's finger, and a controller of the tool receives signals from the sensors to determine the user's purpose and then generate corresponding commands to control the tool to turn on/off a horizontal laser beam and/or a vertical laser beam through the front projection window 2. For example, when the finger is moved from the sensor S1 to S3, the horizontal laser beam is turned on, and when the finger is moved from the sensor S3 to S1, the horizontal laser beam is turned off; when the finger is moved from the sensor S5 to S4, the vertical laser beam is turned on, and when the finger is moved from the sensor S4 to S5, the vertical laser beam is turned off.

Figure 5:
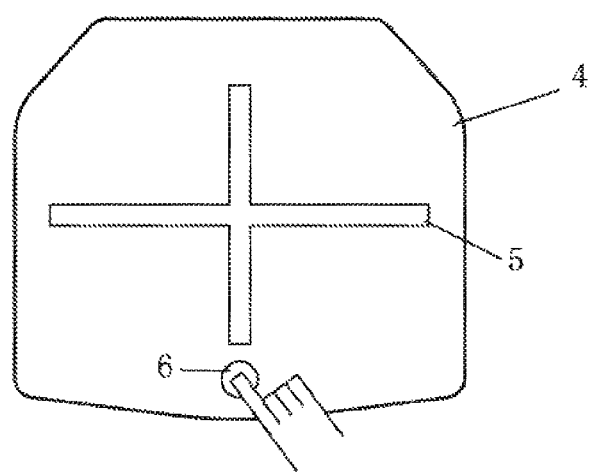

As shown in FIG. 5, when the user's finger taps on the tap mark 6, the sensor S6 senses the action of the user's finger and a controller of the tool generated corresponding commands to control the tool to turn on a plumb laser dot through the top window 3, and when the finger taps on the tap mark 6 again, the plumb laser dot is turned off.

Figure 6:
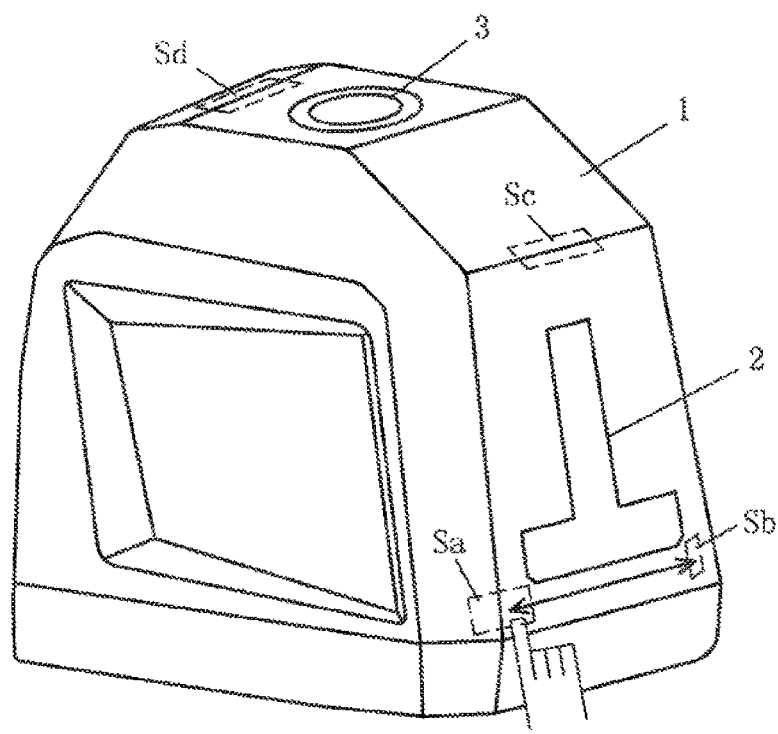
FIGS. 6 and 7 are schematic perspective view of the laser leveling tool showing gesture control functionalities provided at other locations of the leveling tool and actions that can be performed in related with these gesture control functionalities.
Figure 7:
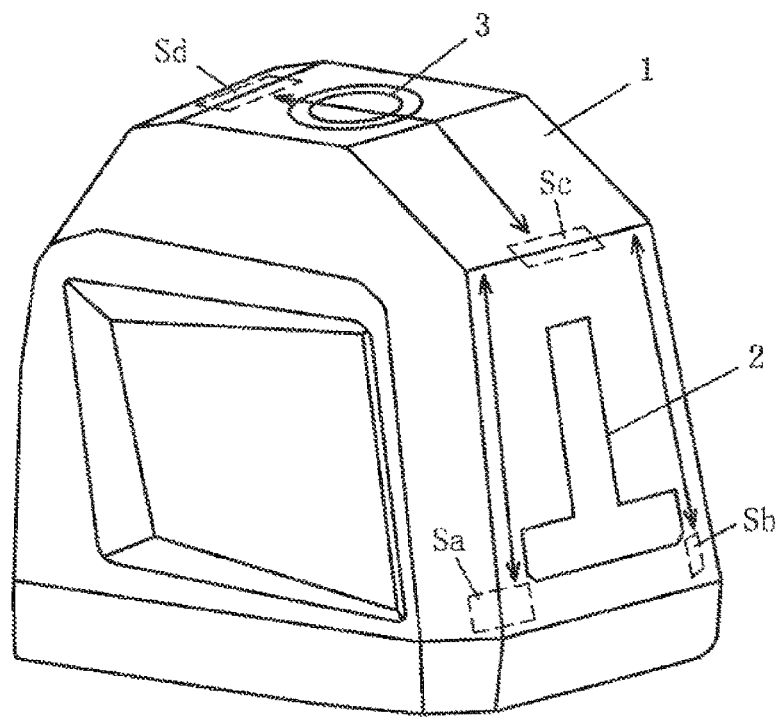

Alternatively or in addition, the tool may comprise sensors arranged in other locations to form gesture control means. As an example, as shown in FIGS. 6 and 7, a sensor Sa is arranged near a first end of the horizontal branch of the front projection window 2, and a sensor Sb is arranged near a second end of the horizontal branch of the front projection window 2. A sensor Sc is arranged near a top-front edge of the housing 1 above the vertical branch of the front projection window 2, and a sensor Sd is arranged near a top-back edge of the housing 1, the sensors S c and Sd being at opposite sides of the top window 3. The sensors Sa to Sd can be mounted either in the inner side of the housing 1 or on the housing 1, depending on whether their sensor fields can pass through the housing 1 or not.

The controller of the tool can receive signals from the sensors Sa to Sd and generates corresponding commands to control the tool to turn on/off the laser beams. For example, as shown in FIG. 6, when the figure moves horizontally from the sensor Sa to the sensor Sb, the horizontal laser beam is turned on, and when the figure moves horizontally from the sensor Sb to the sensor Sa, the horizontal laser beam is turned off; when the figure moves vertically from the sensor Sa or Sb to the sensor Sc, the vertical laser beam is turned on, and when the figure moves vertically from the sensor Sc to the sensor Sa or Sb, the vertical laser beam is turned off; when the finger moves from the sensor Sc to the sensor Sd or taps on one of the sensors Sc and Sd, the plumb laser dot is turned on, and when the finger moves from the sensor Sd to the sensor Sc, or taps on the other one of the sensors Sc and Sd, or taps on the one of the sensors Sc and Sd again, the plumb laser dot is turned off.

Other types of actions of the finger, such as taping on two sensors at the same time, swiping over three or more sensor in a non-linear path, etc., may be used by the controller to generate other commands.

Other types laser beam on/off operations can be achieved by arranging corresponding sensors and correlating the input commands with the sensed signals of the sensors.

Figure 8:
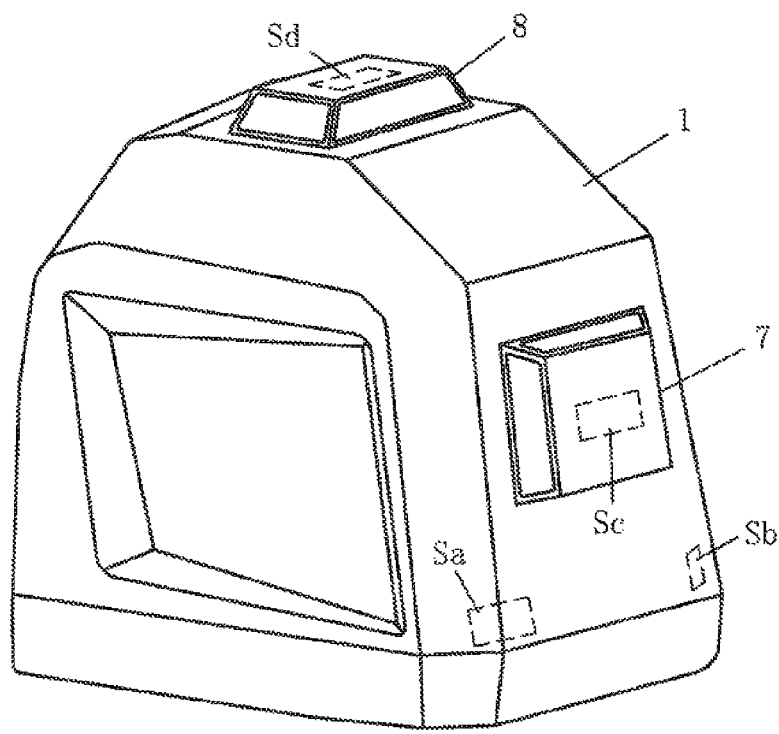
FIG. 8 is a schematic perspective view of a laser leveling tool which is of a different type and is also equipped with gesture control functionalities.

The gesture control means formed by sensors of the disclosure is also applicable in other types of tools. For example, for a tool with turrets 7 and 8 as shown in FIG. 8, sensors Sa and Sb may be disposed below the front turret 7, a sensor Sc may be disposed on the front turret 7, and a sensor Sd may be disposed on the top turret 8. Laser on/off toggling operations related with the sensors Sa to Sd may be similar to that described with reference to FIGS. 6 and 7.

It is understood that, for all the embodiments of the disclosure, the turning on/or off of all the laser beams (horizontal, vertical, dot, cross or the like) can be achieved by taping on corresponding sensors or swiping (moving) between corresponding sensors. However, swiping between sensors can provide higher reliability, which can be understood with reference to FIG. 9.

Figure 9:
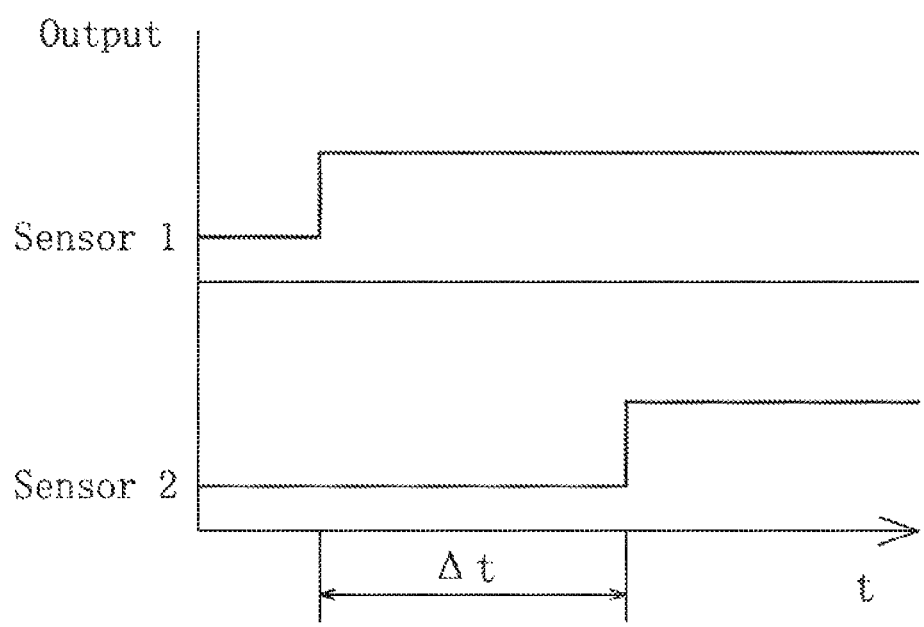
FIG. 9 is a schematic diagram showing the principle of sensing a moving action using two sensors according to the disclosure.

FIG. 9 shows signals of two sensors. When the finger approaches the first sensor, the state of the output of the first sensor changes (for example, jumps), and when the finger moves to and approaches the second sensor, the state of the output of the second sensor changes (for example, jumps). There is a trigger delay $\Delta t$, for example, 75 ms to 750 ms from the change of the state of the output of the first sensor and the change of the state of the output of the second sensor. The trigger delay $\Delta t$ can prevent false trigger of the turning on/or off of the laser beams. Different trigger delays may be used by the controller for determining different laser on/off commands.

Figure 10:
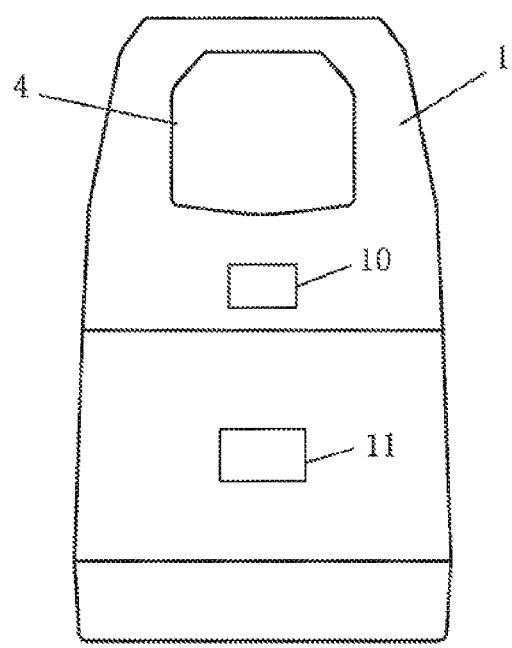
FIG. 10 is a schematic perspective view of a laser leveling tool according to a long distance approach embodiment of the disclosure.

According to another aspect of the disclosure as shown in FIG. 10, gesture control means of long distance approach may comprise a sensor (for example, CMOS sensor) 10 that can sense gestures and/or motions of the user's body in a relatively long distance, for example, in several meters to dozens of meters, such as in about 10 meters. The sensor 10 may be mounted to or in the housing 1, for example, at the back side of the laser leveling tool. The sensor range of the sensor 10 may also be adjustable. Sensed signals of the sensor 10 are transmitted to the controller for determining the user's purpose and then generating corresponding commands to control the operation of the laser leveling tool (similar to that described with reference to short distance approach embodiments). There may be more than one sensor 10 in the laser leveling tool.

The sensor 10 of long distance approach may be a sensor that can capture images of the user's body when the user is exposed in an irradiation in a capturing area of the sensor 10. For example, the irradiation may be visible or invisible light. The irradiation may come from the environment light or come from as irradiation emitter 11 of the laser leveling tool.

The irradiation emitter 11, if any, may be also mounted to or in the housing 1, and there may be more than one irradiation emitter 11 in the laser leveling tool.

As an example of the long distance approach sensor 10, those that can capture images of the user can be used here. For example, the sensor 10 may be micro cameras that can capture the user's image in visible light.

As an example of the long distance approach sensor 10, IR sensors or passive IR sensors may be used here for capturing the user's images in invisible lights. For an IR sensor, it comprises an IR emitter and an IR receiver. The IR emitter emits IR rays. The IR rays emitted from the IR emitter is irradiated onto the user's body, and then images of the user's body when exposed in the IR rays can be sensed by the IP receiver. For a passive IR sensor, it may comprise only an IR receiver for sensing the user's body when exposed in the IR rays come from environment light.

Other types of long distance approach sensors (with or without an irradiation source) can also be used here.

The short and long distance approaches may be used in combination in the same laser leveling tool.

As can be seen, according to the disclosure, the laser leveling tool comprises gesture control means to substitute the physical press buttons used in traditional leveling tools. In operation of the leveling tool, commands can be inputted by swiping, taping or other types of actions of the user's finger, hand or body, and no press down action is needed. Deficiencies in the laser leveling tools resulted from physical press buttons are eliminated.

While certain embodiments have been described, these embodiments have been presented by way of example only, and are not intended to limit the scope of the disclosure. The disclosure are intended to cover all the modifications, substitutions and changes as would fall within the scope and spirit of the disclosure.

The invention claimed is:

1. A laser leveling tool comprising:
   a gesture control device having at least one sensor configured to sense at least one of gestures and movements of a user; and
   a controller in communication with the gesture control device and configured to (i) receive signals from the at least one sensor and (ii) generate control commands for the laser leveling tool based on the received signals, the control commands at least including control commands configured to control on and off states of laser beam patterns projected by the laser leveling tool.

2. The laser leveling tool of claim 1, wherein:
   the at least one sensor includes at least two sensors arranged at heights that are substantially similar; and
   the controller is configured to (i) generate a control command configured to activate a horizontal laser beam in response to the user swiping from a first sensor of the at least two sensors to a second sensor of the at least two sensors and (ii) generate a control command configured to deactivate the horizontal laser beam in response to the user swiping from the second sensor of the at least two sensors to the first sensor of the at least two sensors.

3. The laser leveling tool of claim 1, wherein:
   the at least one sensor includes least two sensors arranged at different heights; and
   the controller is configured to (i) generate a control command configured to activate a vertical laser beam in response to the user swiping from a first sensor of the at least two sensors to a second sensor of the at least two sensors and (ii) generate a control command configured to deactivate the vertical laser beam in response to the user swiping from the second sensor of the at least two sensors to the first sensor of the at least two sensors.

4. The laser leveling tool of claim 1, wherein:
   the at least one sensor includes a first sensor configured to sense a tapping on the first sensor by the user; and
   the controller is configured to generate a control command configured to one of activate and deactivate a plumb laser dot in response to the user tapping the first sensor.

5. The laser leveling tool of claim 1, wherein:
   the at least one sensor includes at least two sensors configured to sense a swiping on the at least two sensors by the user; and
   the controller is configured to generate a control command configured to one of activate and deactivate a plumb laser dot in response to one of (i) the user swiping from a first sensor of the at least two sensors to a second sensor of the at least two sensors and (ii) from the second sensor of the at least two sensors to the first sensor of the at least two sensors.

6. The laser leveling tool of claim 1 further comprising:
   a human-machine interface (HMI),
   wherein at least one of the at least one sensor is one of (i) arranged on a screen of the HMI and (ii) arranged under the screen of the HMI.

7. The laser leveling tool of claim 6, wherein the screen has at least one mark corresponding to the at least one of the at least one sensor that directs the user in performing at least one of swiping actions and tapping actions.

8. The laser leveling tool of claim 1 further comprising:
   a housing,
   wherein at least one of the at least one sensor is one of (i) arranged on the housing and (ii) arranged at an inner side of the housing.

9. The laser leveling tool of claim 1, wherein:
   in response to when the user being sensed by two sensors of the at least one sensor in sequence, there is a time delay between respective signals of the two sensors; and
   the controller is configured to generate control commands configured to one of turn on and turn off a laser based on the respective signals of the two sensors and the time delay.

10. The laser leveling tool of claim 1, wherein the at least one sensor has a sensor range between 10 mm and 20 mm.

11. The laser leveling tool of claim 10, wherein the at least one sensor includes at least one of an infrared sensor, a capacitive sensor, a passive infrared sensor, a resistive sensor, and a magnetic sensor.

12. The laser leveling tool of claim 1, wherein the at least one sensor is configured to capture the at least one of the gestures and the movements of the user while the user is within a capturing area of the at least one sensor.

13. The laser leveling tool of claim 11, wherein the at least one sensor is configured to capture images of the user while the user is exposed in an irradiation in the capturing area of the sensor.

14. The laser leveling tool of claim 13, wherein the irradiation is one of (i) visible light and (ii) invisible light.

15. The laser leveling tool of claim 14 further comprising:
   an emitter configured to emit the one of (i) the visible light and (ii) the invisible light.

16. The laser leveling tool of claim 12, wherein the at least one sensor has have a sensor range of about 10 meters.

17. The laser leveling tool claim 12, wherein the at least one sensor includes at least one of a camera, an infrared sensor, and a passive infrared sensor.

18. The laser leveling tool of claim 1, wherein the at least one sensor has an adjustable sensor range.

* * * * *